April 14, 1942.  H. VAUDOUX  2,279,422
DIRECTIONAL ANTENNA
Filed June 6, 1940   2 Sheets-Sheet 1
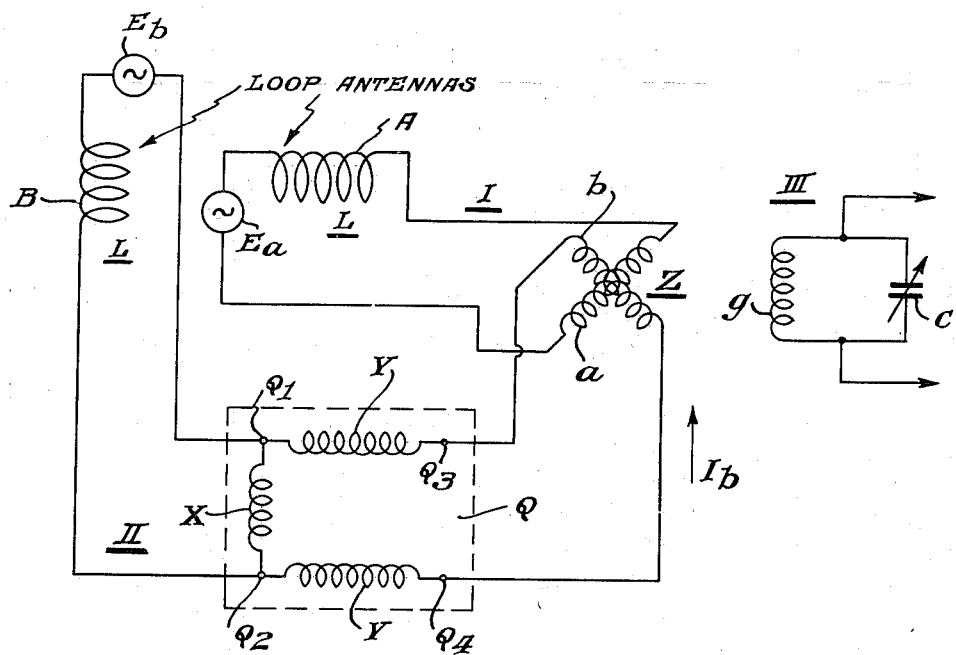
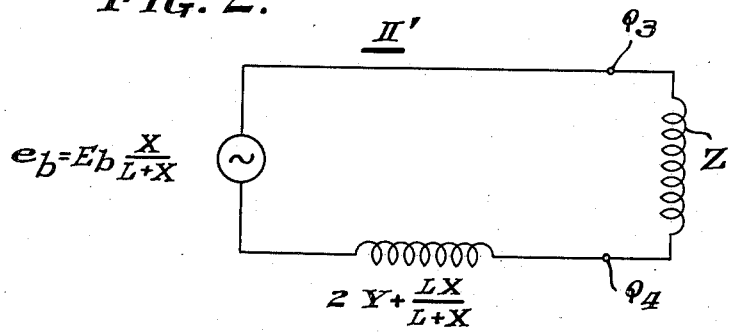
Inventor
Henry Vaudoux
By
Attorney April 14, 1942.  H. VAUDOUX  2,279,422
DIRECTIONAL ANTENNA
Filed June 6, 1940  2 Sheets-Sheet 2
Fig. 3.
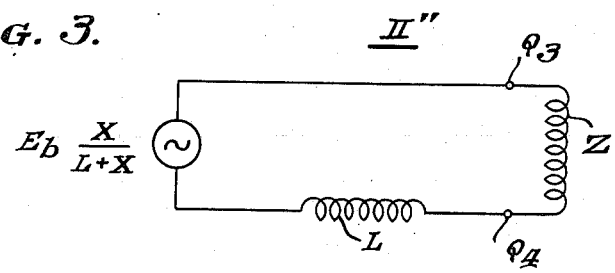
Fig. 4.
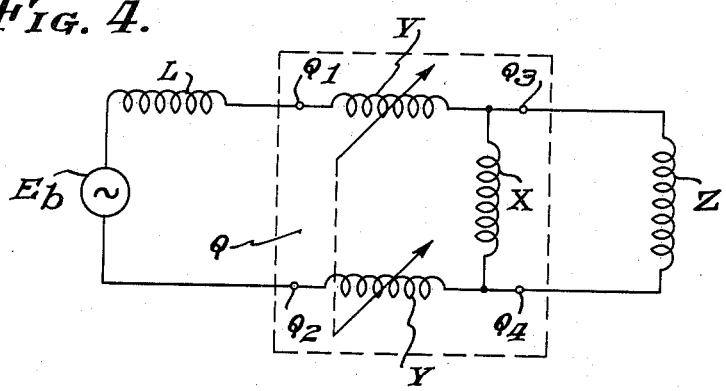
Fig. 5.
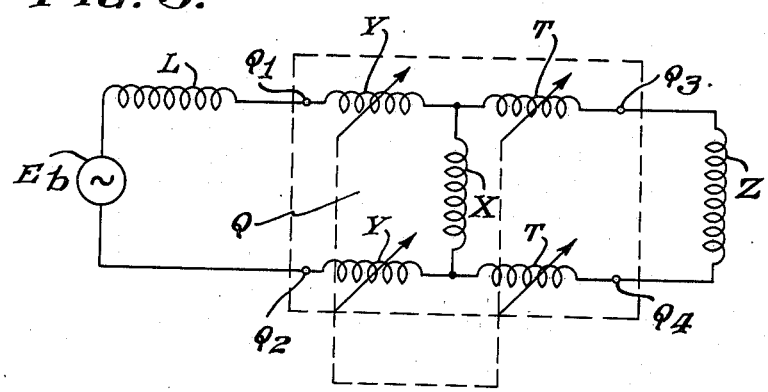
Inventor
Henry Vaudoux
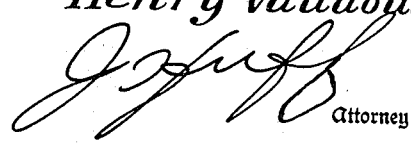
Attorney Patented Apr. 14, 1942

2,279,422

UNITED STATES PATENT OFFICE 2,279,422

DIRECTIONAL ANTENNA

Henry Vaudeux, Paris, France, assignor to Compagnie Generale de Telegraphie sans Fil, a corporation of France Application June 6, 1940, Serial No. 339,163
In France April 6, 1939

8 Claims. (Cl. 250—11)

The present invention has as its object a method adapted to compensate what is known as the board effect or quadrantal error of goniometers with fixed loops, especially in airplane or ship's radio goniometers.

It is known that the quadrantal error is caused by metallic bulk or masses, closed loops or paths or circuits, etc., which happen to be near the direction finder loops and which by virtue of their reaction or secondary radiation modify the field by means of which bearings are to be taken.

It is known that the systematic bearing error which results from the above-mentioned sources can be corrected and compensated in any equipment or installation by the aid of curves which are plotted empirically. These curves as a general rule have a shape that is more or less sinusoidal, and they also differ with the wave length of the signal.

In order to avoid the necessity of providing compensation curves for each bearing, mechanical compensator devices have been used in practice, especially in radio goniometers with rotating loops. Thus, by means of gears or cams of suitable contour interposed between the adjustable pick-up coil and the indicator pointer, it is possible to read directly the correct bearings on a dial, the bearing being correct notwithstanding board or quadrantal error effects. To the same end, particularly in connection with radio goniometers with rotating loop antennas, closed conducting loops have been disposed so as to correct the board effect by virtue of their reaction upon the antenna. These correcting loops impart to the field intercepted by the loop antenna the direction which it would have in the absence of neighboring masses of metal.

In the case of radio goniometers with fixed loop antennas and more particularly for airplane radio goniometers the use of such a compensator loop coupled with one of the directional antennas involves certain inconveniences. The dimensions and the weight of the compensator loop are not negligible, especially where the aim is to make conditions so that the compensator action will not be accompanied by an appreciable loss or vitiation of the zero points. On the other hand, if the dimensions of the compensator loop are small, it is necessary to make the coupling between the compensator loop and the loop antenna of the goniometer very strong, if adequate correction is to be insured, and this results in an appreciable decrease of the inductance of the latter, which, in turn, translates itself into detuning between the circuits and a loss of sharpness of the resonance point. In order to avoid this detuning, it is necessary to place the compensator loop at a greater distance from the antenna, though this necessitates choosing larger dimensions for it, and this is not always permissible particularly on airplanes.

According to the invention, compensation of airplane board or quadrantal error effects in radio goniometers of the fixed-loop antenna type is insured simply by including in the line which connects one of the loop antennas with the corresponding coil of the goniometer an assembly of adjustable impedances (more particularly a group of inductances) of a value and size suitably chosen so as to restore between the currents which flow to these coils the relationship and proportion which would prevail in the absence of the quadrantal error and the sources thereof, that is, if the fields intercepted by the loops had not been modified by the existence of conducting masses or of neighboring circuits.

This invention will be better understood from the following description when considered in connection with the accompanying drawings, in which Figure 1 is a circuit diagram of a compensated loop antenna goniometer arrangement; Figures 2 and 3 are equivalent circuits of portions of the circuit of Figure 1; and Figures 4 and 5 are alternative compensating circuits.

Referring to Fig. 1, A and B designate two fixed loop antennas which pick up the electromagnetic field coming in from the transmitter or beacon station whence bearings are to be taken. The reference characters $a$ and $b$ denote the two induction or "field" coils, while $g$ indicates the induced coil or search coil of the goniometer.

One of the loops A is connected directly to the corresponding field coil $a$ resulting in a first aperiodic circuit I.

The other loop B is connected to the field coil $b$, according to the invention, by way of the quadripole (four-terminal H network), Q which here comprises two identical inductances, Y connected in series with the two-conductors of the coupling line, and an inductance X connected across the line. The assembly comprising the elements B, Q, and $b$ results in the second aperiodic circuit II.

Coil $g$ of the search coil, finally, is connected to a tuning condenser C which is adapted to regulate the resonance point of the assembly of the circuits including I, II and III, the latter circuit, as well known, being connected to the amplifying stages (not shown) of the radio goniometer.

Denoting, then, by L the impedance of each of the loops A and B (the inductance values thereof being by construction made virtually alike); by Z the apparent impedance of each of the coils $a$ and $b$, by $E_b$ the E. M. F. induced in the loop B, and by $I_b$ the current resulting therefrom in the coil $b$ of the goniometer, and if moreover the coils are of suitable construction, in other words, if their resistance may be disregarded in comparison with their inductance, it is possible to write approximately $$I_b = \frac{E_b \cdot \frac{X}{L+X}}{2Y + \frac{LX}{L+X} + Z}$$

In other words, current $I_b$ which traverses the coil $b$ is the same as that which would flow in the impedance Z of equivalent circuit II′ shown in Fig. 2, this circuit simply differing from circuit II in that the impedance of the part which is shown on the left of the terminals Q3 and Q4 has been replaced by a single series impedance XY of a value $$2Y + \frac{LX}{L+X}$$

and the voltage $E_b$ induced in coil B has been replaced by an E. M. F. of reduced value $$e_b = E_b \cdot \frac{X}{L+X}$$

But if, then, the values X and Y are chosen in such a way that the impedance $$2Y + \frac{LX}{L+X}$$

is just equal to impedance L of the loop, in other words, if $$2Y + \frac{LX}{L+X} = L \qquad (1)$$

there results another equivalent circuit II″ which is shown in Fig. 3. It will be noted that the assembly thereof has exactly the same impedance L+Z which the circuit II would possess in the absence of the four-terminal network or quadripole Q (also the same impedance as the circuit I), in which, however, the E. M. F. induced by the loop would be reduced at the ratio $$\frac{X}{L+X}$$

In other words, looking at the situation from the viewpoint of the current flowing in coil $b$, it would be the same as if the interposition of a four-terminal network Q between the loop B and the coil $b$ had not modified in any respect the impedance of the circuit II, but rather as if the E. M. F. induced in the loop has been reduced at the ratio $$\frac{X}{L+X}$$

Inserting this four-terminal network in the lead of the one of the two loop antennas of the radio goniometer (here loop B) in which the quadrantal error or board effect occasions the least reduction of the field to be intercepted ($E_b > E_a$), if value $$\frac{X}{L+X}$$

be suitably chosen, the correct effect of this field upon the coils of the search member may be preserved by reducing the effect of the stronger one, however, without incidentally causing a change of the apparent characteristics of the loop thus compensated; that is to say, without causing any detuning in the assembly of the circuits which work upon the amplifier and without reducing as a result the sharpness or accuracy of the bearing.

A simple calculation demonstrates that the introduction of quadripole Q in the circuit of one of the loop antennas results in a rotation of the bearing angle which has the maximum value (at 45 degr.):

$$\alpha = 45° - \tan^{-1} \frac{X}{L+X} \qquad (2)$$

To correct the board or quadrantal error of the radio goniometer for a given installation of the loops on board an airplane or a vessel, and for a fixed wavelength, this error having a maximum value $\alpha$ (maximum of sinusoidal correction curve), it will thus be sufficient to regulate the inductances X and Y in such a way that the two relations 1 and 2 are satisfied.

This regulation is fixed empirically once and for all for a given circuit arrangement and location of masses, and for every wavelength, a tabulation or a graph being, for instance, plotted which will give for each wavelength the values that must be chosen for X and for Y.

The impedances of the correcting network Q may be in the form of variable inductances adjusted in steps by contacts and switches or continuously by means of a variometer.

The two arms Q1 Q3 and Q2 Q4 which for reasons of symmetry must always be of the same value Y could then be coupled with one another mechanically so that the operator would have to vary only two knobs. But these two knobs could also be connected together so that the relation 1, which is equivalent to the relation $$2Y = \frac{L^2}{L+X}$$

will always be satisfied. Adjustment of the quadrantal error effect could then be obtained by operating a single knob.

Also a single switch comprising several rows or banks of contacts could be used between which inductance elements having convenient values may be connected.

It will be understood that the invention is not confined to the particular embodiment of the quadripole which has hereinbefore been indicated; indeed, recourse could be had also to any assembly or combination of impedances no matter what number thereof, provided that a similar effect or result is secured.

Exemplified assemblies are illustrated in Figs. 4 and 5. Referring to Fig. 4, it will be noticed that the quadripole comprises still two impedances Y in series, one between Q1 and Q3, the other one between Q2 and Q4; but the shunt impedance X is placed below, that is, on the search coil end, instead of being connected above at the loop antenna end.

Equation 1 thus becomes in this case:

$$L = \frac{(L+2Y)X}{L+2Y+X} \qquad (3)$$

and the apparent E. M. F. due to coil $b$ is reduced to $$e'_b = \frac{X}{L+2Y+X} E_b \qquad (4)$$

Referring to Fig. 5 it will be seen that the four terminal network, while still symmetric, comprises four equal series impedances forming pairs, Y and T, one pair connected below and the other pair connected above a shunt impedance X.

Equation 1 in this case becomes $$L = 2T + \frac{(L+2Y)X}{L+2Y+X} \quad (5)$$

whereas the apparent E. M. F. of coil B is again reduced just as in the preceding instance to this value $$e''_b = \frac{X}{L+2Y+X} E_b \quad (6)$$

Whichever embodiment and form of construction may be chosen so far as the constitution of the quadripoles is concerned, the circuit organisation of this invention offers the following advantages in comparison with the compensating method predicated upon the use of a compensating loop coupled to one of the antennas:

(1) Simplicity of construction, low weight, limited space requirements for circuit elements needed which consist of a few variable impedances.

(2) Ability to correct and compensate appreciable errors with limited circuit requirements.

(3) Ease of regulation of correction, either as a function of the signal wave-length or for different arrangements of the metallic masses and neighboring stray or interfering circuits.

(4) Preservation of sharpness and accuracy of the bearing, since the presence of the compensator does not occasion any change in the apparent inductance of the frames and their lines that is to say, no detuning of the circuits.

(5) Regulation of compensation depends only upon the value of the deviation or quadrantal error to be corrected, the impedance of the coil and the impedances in the quadripole.

So far as the latter point is concerned, it will be noted that the regulation and adjustment of the quadripole is independent of the apparent impedance Z of the search coils, even if the oscillation circuit III happens to be detuned. As a matter of fact, the two loop antennas and their leads always have the same characteristics, and it is solely the E. M. F.'s applied to each of them that appear to vary.

It will also be noted that the regulation of the quadripole makes it also possible, if desired, to correct inequalities in the characteristics of the frames and the lines which join them with the quadripoles.

It will also be understood that for the sake of convenience of adjustment or to avoid all dissymmetries in the capacities of the circuits of the two frames, it is possible, according to the invention, to connect a quadripole in the connections of each of the two frames. These two quadripoles could then be either identical or different, and one of them could be replaced by any desired assembly of inductances and capacities which will insure a more perfect balance of the assembly.

I claim as my invention:

1. The method of correcting quadrantal errors in a directional receiving system having a pair of loop antennas connected, respectively, to a pair of goniometer field coils, one of said connections including a quadripole network including shunt and series impedances, which includes the steps of receiving signalling voltages with said loops, and adjusting said impedances to such values that the amplitude of the current flowing in one of said field coils is reduced an amount to compensate for said error, while maintaining the phase of said current the same as that which would flow in the absence of said quadripole.

2. In a direction finding system, a pair of directional antennas, a goniometer having field coils coupled respectively to said antennas, and means comprising an impedance network connected between one of said antennas and its associated field coil for attenuating the amplitude of the current flowing in said field coil while maintaining the phase of said current the same as that of the current which would flow in said field coil in the absence of said network.

3. The method of correcting quadrantal errors in a directional receiving system having a pair of loop antennas connected, respectively, to a pair of goniometer field coils, one of said connections including a quadripole network including shunt and series impedances, which includes the steps of receiving signalling voltages with said loops, adjusting said shunt impedance to a value determined by the impedance of said loop and the angular correction required, and adjusting said series impedances to values determined by said loop impedance and the impedance of said shunt impedance so that only the amplitude of the current flowing in said field coil is affected.

4. The method of correcting quadrantal errors in a directional receiving system having a pair of loop antennas connected, respectively, to a pair of goniometer field coils, one of said connections including a quadripole network including shunt and series impedances, which includes the steps of receiving signalling voltages with said loops, adjusting said shunt impedance to a value determined by the equation $$\alpha = 45° - \tan^{-1}\frac{X}{L+X}$$

and adjusting said series impedances to values determined by the equation $$2Y + \frac{LX}{L+X} = L$$

where $\alpha$ = the angular quadrantal error
$X$ = the shunt impedance
$Y$ = the series impedances
$L$ = the loop impedance.

5. In a direction finding system, a pair of directional antennas, a goniometer having field coils connected, respectively, said antennas, and a quadripole impedance network including shunt and series impedances connected between one of said antennas and its associated field coil for minimizing quadrantal errors, said shunt impedance being determined by the equation $$\alpha = 45° - \tan^{-1}\frac{X}{L+X}$$

and said series impedances being determined by the equation $$2Y + \frac{LX}{L+X} = L$$

where $\alpha$ = the angular quadrantal error
$X$ = the shunt impedance
$Y$ = the series impedances
$L$ = the loop impedance.

6. In a direction finding system, a pair of directional antennas, a goniometer having field coils connected, respectively, to said antennas, and a quadripole impedance network in one of said connections including a shunt impedance X at the input and in parallel with said antenna, and series impedances Y at the output end of said quadripole, said shunt impedance being determined by the equation $$\alpha = 45° - \tan^{-1} \frac{X}{L+X}$$

and said series impedances being determined by the equation $$2Y + \frac{LX}{L+X} = L$$

where $\alpha$ = the angular quadrantal error
L = the loop impedance of the directional antenna.

7. In a direction finding system, a pair of directional antennas, a goniometer having field coils connected, respectively, to said antennas, and a quadripole impedance network in one of said connections including series impedances Y at the input end and a shunt impedance X at the output end of said quadripole, said shunt impedance being determined by the equation $$\alpha = 45° - \tan^{-1} \frac{X}{L+X}$$

and said series impedances being determined by the equation $$L = \frac{(L+2Y)X}{L+2Y+X}$$

where $\alpha$ = the quadrantal error
L = the loop impedance.

8. In a direction finding system, a pair of directional antennas, a goniometer having field coils connected, respectively, to said antennas, and a quadripole impedance network in one of said connections including series impedances Y at the input and series impedances T at the output of said quadripole, and a shunt impedance X at the center thereof, said shunt impedance being determined by the equation $$\alpha = 45° - \tan^{-1} \frac{X}{L+X}$$

and said series impedances each being determined by the equation $$L = 2T + \frac{(L+2Y)X}{L+2Y+X}$$

where $\alpha$ = the angular quadrantal error
L = the loop impedance.

HENRY VAUDOUX.